United States Patent [19]

Pecoraro et al.

[11] Patent Number: 4,528,089
[45] Date of Patent: Jul. 9, 1985

[54] HYDROGENATION PROCESSES USING CARBON-CONTAINING MOLYBDENUM AND TUNGSTEN SULFIDE CATALYSTS

[75] Inventors: Theresa A. Pecoraro, Danville, Calif.; Russell R. Chianelli, Somerville, N.J.

[73] Assignee: Exxon Research and Engineering Co., Florham Park, N.J.

[21] Appl. No.: 552,403

[22] Filed: Nov. 16, 1983

Related U.S. Application Data

[63] Continuation-in-part of Ser. No. 399,999, Jul. 20, 1982, abandoned.

[51] Int. Cl.³ ............................................. C10G 45/04
[52] U.S. Cl. ............................ 208/216 R; 208/254 H
[58] Field of Search ....................... 208/216 R, 254 H

[56] References Cited

U.S. PATENT DOCUMENTS

| | | | |
|---|---|---|---|
| 2,481,824 | 9/1949 | Claussen et al. | 502/182 |
| 2,715,603 | 9/1952 | Lanning et al. | 196/53 |
| 2,884,370 | 4/1959 | Nonnenmacher et al. | 208/216 R |
| 2,894,903 | 7/1959 | McGrath et al. | 208/216 R |
| 2,914,462 | 12/1953 | Hemminger | 208/112 |
| 3,074,783 | 6/1959 | Paull | 23/212 |
| 3,148,135 | 7/1961 | Schlinger et al. | 208/58 |
| 4,066,530 | 1/1978 | Aldridge et al. | 208/112 |
| 4,082,652 | 4/1978 | Voorhles | 208/216 R |
| 4,134,825 | 1/1979 | Bearden et al. | 208/108 |
| 4,213,850 | 7/1980 | Riddick, Jr. et al. | 208/216 R |
| 4,243,553 | 1/1981 | Naumann et al. | 502/220 |
| 4,243,554 | 1/1981 | Naumann et al. | 502/220 |
| 4,285,804 | 8/1981 | Jacquin et al. | 208/216 R |
| 4,357,229 | 11/1982 | Bearden, Jr. et al. | 208/210 |

FOREIGN PATENT DOCUMENTS

| | | | |
|---|---|---|---|
| 7510059 | 3/1976 | Netherlands | 502/220 |
| 7603197 | 9/1976 | Netherlands | 502/220 |
| 404422 | 10/1932 | United Kingdom | 208/112 |
| 808336 | 2/1959 | United Kingdom | 502/220 |

Primary Examiner—D. E. Gantz
Assistant Examiner—Cynthia A. Prezlock
Attorney, Agent, or Firm—Edward M. Corcoran

[57] ABSTRACT

Sulfur and nitrogen-containing hydrocarbon feeds are upgraded by contacting said feed, at elevated temperature and in the presence of hydrogen, with a catalyst comprising a carbon-containing sulfide of a catalytic metal selected from the group consisting of tungsten, molybdenum and mixture thereof. In a preferred embodiment, these catalysts are promoted with certain transition metal sulfides such as cobalt sulfide. The catalyst may be preformed or formed in-situ in the feed or from catalyst precursor salts.

29 Claims, 6 Drawing Figures

HYDROGENATION PROCESSES USING CARBON-CONTAINING MOLYBDENUM AND TUNGSTEN SULFIDE CATALYSTS

CROSS-REFERENCE TO RELATED APPLICATION

Continuation-in-part of U.S. Ser. No. 399,999, filed July 20, 1982, now abandoned.

BACKGROUND OF THE INVENTION

1. Field of the Invention

This invention relates to hydrotreating hydrocarbon oils by contacting same with a catalyst comprising a poorly crystalline, carbon-containing sulfide of a catalytic metal selected from the group consisting of tungsten, molybdenum and mixture thereof. More particularly, this invention relates to hydrotreating hydrocarbon oils by contacting said oil, at elevated temperature and in the presence of hydrogen, with a catalyst comprising a poorly crystalline, carbon-containing sulfide of a catalytic metal selected from the group consisting of tungsten, molybdenum and mixtures thereof, promoted with one or more transition metal sulfides, such as cobalt sulfide.

2. Background of the Disclosure

The petroleum industry is increasingly turning to coal, tar sands and heavy crudes as sources for future raw materials. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating which includes reactions such as hydrodesulfurization to remove sulfur compounds, hydrogenating to saturate olefins and condensed aromatics and also hydrodenitrogenation.

Catalysts most commonly used for these hydrotreating reactions include things such as cobalt molybdate on alumina, nickel on alumina, cobalt molybdate promoted with nickel, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrorefining processes. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum sulfide has other well-known uses as a catalyst, including hydrogenation, and is also useful for the water gas shift and methanation reactions.

In general, with molybdenum and other transition metal sulfide catalysts as well as with other types of catalysts, higher catalyst surface areas generally result in more active catalysts then similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300°-800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

It has now been discovered that carbon-containing molybdenum and tungsten sulfides are effective catalysts for hydrorefining or hydrotreating hydrocarbon feedstocks and that these catalysts are even more effective than conventional hydrorefining catalysts when they are promoted with small amounts of promotor metal such as cobalt. Thus, the present invention relates to a process for hydrorefining or hydrotreating hydrocarbon feeds comprising contacting said feed in a hydrotreating zone at elevated temperature and in the presence of hydrogen, with a catalyst comprising a poorly crystalline, carbon-containing sulfide of a metal selected from the group consisting of Mo, W, and mixture thereof. The catalyst will have the general formula $MS_{2-z}C_{z'}$ wherein $0.01 \leq z \leq 0.5$ and $0.01 \leq z' \leq 3.0$. The temperature in the hydrorefining zone will generally range from about 200° to 450° C. The hydrogen present in the hydrotreating zone may be present in the feed as gaseous $H_2$, one or more hydrogen donor hydrocarbons such as tetralin, or combination thereof.

Copending application U.S. Ser. No. 552,404 filed simultaneously herewith discloses that these catalysts are poorly crystalline and may either be preformed or may be formed in-situ in the feed from one or more catalyst precursors selected from the group consisting of (a) ammonium thiomolybdate or thiotungstate salts, (b) ammonium molybdate or tungstate salts, (c) substituted ammonium thiomolybdate or thiotungstate salts, (d) substituted ammonium molybdate or tungstate salts, and mixture thereof.

DETAILED DESCRIPTION

The process of this invention may be used to hydrorefine or hydrotreat any natural or synthetic hydrocarbon feed. Preferred operating conditions in the hydrorefining or hydrotreating zone include temperatures of from about 200° to 500° C., preferably 250°–400° C. at pressures ranging from about atmospheric to 5000 psig, preferably from about 200 to 1500 psig. Hydrogen may be present in the hydrorefining zone as gaseous hydrogen, a hydrogen-bearing gas, one or more hydrogen donor solvents, such as tetralin, or combination thereof.

As disclosed in co-pending application, U.S. Ser. No. 552,404 the catalysts useful in the process of this invention have the general formula $MS_{2-z}C_{z'}$ wherein $0.01 \leq z \leq 0.5$ and $0.01 \leq z' \leq 3.0$. These catalysts have surface areas of up to about 350–400 m²/gm, have unique pore size distributions and are particularly effective when promoted with certain transition metal sulfides such as cobalt sulfide. Precursor salts useful in forming the catalysts useful in the process of this invention will have the formula $B_x[MO_yS_{4-y}]$ wherein x is 1 or 2 and y is any value between 0 and 4, wherein B is (a) an ammonium ion, (b) an alkyl or aryl diammonium ion, (c) an alkyl or aryl ammonium ion wherein said ion may contain from 1–4 alkyl or aryl groups and wherein M is Mo or W. In a preferred embodiment, y will be any value ranging from 0 to 3. Illustrative but non-limiting examples of suitable substituted aliphatic ammonium ions include $n-C_4H_9NH_3^+$, $(C_2H_5)_2NH_2^+$, $(CH_3)_3NH^+$ and $(CH_3)_4N^+$. Illustrative, but non-limiting examples of suitable thiomolybdate salts useful in producing the catalysts useful in this invention include $(n\text{-butylamine})_2H_2MoS_4$, $(\text{diethylamine})_2H_2MoS_4$, tetramethyl-ammonium thiomolybdate $[(CH_3)_4N]_2MoS_4$, ethylenediammonium thiomolybdate $H_3N(CH_2)_2NH_3MoS_4$ and tridodecylamine oxythiomolybdate $[(CH_3(CH_2)_4)_3NH]HMoO_2S_2$. Many of the catalyst precursor salts disclosed in U.S. Pat. Nos. 4,243,553 and 4,243,554, the disclosures of which are incorporated herein by reference, will also be useful as precursors for forming the catalysts of this invention. In a preferred embodiment, the catalyst precursor will be oil insoluble.

Those skilled in the art will appreciate that the precursor salts suitable as starting materials for forming the catalyst useful in process of this invention are known materials that can be prepared by synthesis techniques reported in the art. Such techniques are not part of this invention which is directed towards the use of carbon-containing molybdenum and tungsten sulfide catalyst materials, preferably promoted with one or more promotor metals or metal sulfides, for hydrotreating hydrocarbon feeds. Illustrative, but non-limiting examples of useful promotor metals will include any of the well-known promotors such as iron, nickel, cobalt and mixture thereof.

The thermal decomposition of unsubstituted ammonium thiomolybdate salts has been reported in the J. Inorg. Nucl. Chemistry, 35, 1895–1904 (1973), with the thermal decomposition of $(NH_4)_2MoO_2S_2$, $(NH_4)_2MoS_4$, $(NH_4)_2WO_2S_2$ and $(NH_4)_2WS_4$ being disclosed in accordance with available analytical techniques using a Mettler instrument and a DTA/TGA instrument of Linseis KG, West Germany. The experiments were carried out in a nitrogen atmosphere at normal pressure employing a heating rate of 6° C./min. (a heating rate of 6°–10° C./min. being conventional for such analytical procedures). At a decomposition temperature of 400° C., $MoS_2$ was reported as the probable composition. The materials formed by these decomposition procedures do not relate to the catalysts useful in the process of this invention.

The catalysts of this invention are prepared by contacting one or more catalyst precursor salts, in the presence of sulfur, hydrogen and at a temperature of from about 150°–600° C., with a hydrocarbon for a time sufficient to form the catalyst. Preferably, the temperature will range from about 200°–500° C. and still more preferably from about 300°–400° C. The rate at which the precursor is heated is not important, but it has been found that a slow heating rate, i.e., below about 1° C./min. does not result in as good a catalyst as is obtained if the heating rate is above this value.

X-ray powder diffraction analysis has revealed that the catalysts of this invention exhibit poor crystallinity. Those skilled in the art will know that poorly crystalline materials exhibit diffuse Bragg peaks as opposed to sharp Bragg peaks exhibited by crystalline materials. Also, combustion analysis of the catalysts of this invention has shown that they contain nitrogen in addition to the carbon. However, the amount of nitrogen in these catalysts is relatively minor (i.e., <1 wt%) and variations in the amount thereof does not seem to have any effect on the selectivity or activity of the catalysts.

The sulfur required during the formation of the catalyst must be present in an amount at least sufficient to achieve the desired stoichiometry of the catalyst. However, it is preferred that the sulfur will be present in an amount in excess of the stoichiometrically required amount. All or part of this sulfur may be from the precursor salt itself (i.e., a thiomolybdate or thiotungstate). Alternatively, all or part of the sulfur may be from sulfur or a sulfur-bearing compound. However, inasmuch as it is preferred that sulfur be present in an amount in excess of the stoichiometrically required amount, it is preferred that sulfur or a sulfur bearing compound be present irrespective as to whether or not sufficient sulfur is present in the precursor salt. The hydrogen required for forming the catalysts useful in the process of this invention may be present in the form of gaseous hydrogen, a hydrogen-bearing gas such as $H_2S$, a hydrogen donor solvent or combination thereof.

The hydrocarbon used for forming the catalysts useful in this invention may be any hydrocarbon that is convenient, other than a heavy hydrocarbonaceous oil. By heavy hydrocarbonaceous oil is meant any hydrocarbon oil having at least 10 weight percent of material boiling above about 1050° F. at atmospheric pressure, such as various residua, whole and topped crude oils, etc. The hydrocarbon used for forming the catalysts useful in the process of this invention will preferably comprise an aromatic hydrocarbon or a mixture of one or more aromatic hydrocarbons with other hydrocarbons. In fact, the catalysts of this invention may be formed in situ in a sulfur-containing feed merely by contacting one or more suitable precursor salts useful in forming the catalysts of this invention with the feed and hydrogen at a temperature above about 150° C. and preferably above about 200° C. After the catalyst has been formed in-situ in a sulfurcontaining feed, the catalyst will then act to remove sulfur from said feed if hydrogen is present therein. In this case, the hydrogen may be present in the feed as gaseous hydrogen, a hydrogen-bearing gas, one or more hydrogen donor hydrocarbons such as tetralin, or combination thereof.

The invention may be more readily understood by reference to the following examples.

EXAMPLE 1

In this example, an ammonium thiomolybdate $(NH_4)_2MoS_4$ catalyst precursor was pressed under 15,000–20,000 psi and then meshed through 10/20 mesh or 20/40 mesh sieves. One gram of this meshed catalyst precursor was mixed with 10 g of 1/16-in. spheroid porcelain beads and placed in the catalyst basket of a Carberry-type autoclave reactor. The remainder of the basket was filled with more beads. The reactor was designed to allow a constant flow of hydrogen through the feed and to permit liquid sampling during operation.

After the catalyst precursor and beads were charged to the reactor, the reactor system was flushed with helium for about 30 minutes after which hydrogen flow through the reactor was initiated at a rate of 100 cc/min. After the hydrogen began flowing through the reactor, the reactor was charged with 100 cc of a feed comprising a DBT/Decalin mixture which was prepared by dissolving 4.4 g of dibenzothiophene (DBT) in 100 cc of hot Decalin. The solution thus contained about 5 wt.% DBT or 0.8 wt.% S. The hot feed solution was filtered and 1 cc of decane was added.

After the feed was charged to the reactor, the hydrogen pressure was increased to about 450 psig and the temperature in the reactor raised from room temperature to about 350° C. over a period of about ½ hour. The hydrogen flow rate through the reactor was maintained at about 100 cc per minute. When the desired temperature and pressure were reached, a GC sample of liquid was taken and additional samples taken at one hour intervals thereafter. The liquid samples from the reactor were analyzed using a Perkin-Elmer 900 Gas Chromatograph. The composition of the catalyst produced was analyzed for sulfur and carbon by combustion in oxygen at 1600° C. and analyzing the so-formed $SO_2$ and $CO_2$ by infrared spectroscopy and thermal conductivity, respectively. By the time a temperature of 350° C. was reached in the reactor, a catalyst had been formed in-situ which had the following composition:

$$MoS_{1.93}C_{0.94}$$

After the catalyst had been formed it was found to be stable and no further change in its composition took place over an eight hour period that the system was maintained at 350° C. and 450 psig. Further, during the formation of the catalyst, little if any hydrodesulfurization of the DBT in the feed took place.

As the reaction progressed, samples of liquid were withdrawn once an hour and analyzed by GC chromatography in order to determine the activity of the catalyst towards hydrodesulfurization as well as its selectivity for hydrogenation. The hydrodesulfurization activity was determined according to the following model reaction:

DBT dibenzethiophene

-continued

BP
biphenyl

CHB cyclohexyl benzene

BC
bicyclohexyl

The hydrodesulfurization zero order rate constant, r, for the catalyst produced from the in-situ decomposition of the ammonium thiomolybdate was found to be $30 \times 10^{16}$ molecules of DBT desulfurized per gram of catalyst per second. In the rest of the examples, most of the hydrodesulfurization zero order rate constants are normalized to this case for which the HDS activity is set as equal to 100.

The selectivity factor, f, was also determined and is defined in view of the model reaction as the ratio of the hydrogenated products to the total desulfurization as follows:

$$f = CHB/(BP + CHB)$$

It should be noted that the amount of BC produced according to the model reaction was not included in determining the selectivity factor, because the amount of BC produced was always less than 2%. In this experiment, the selectivity factor, f, was found to be 50. The results of this experiment are also contained in Table 1.

This experiment thus establishes the in-situ formation of a catalyst of this invention and its usefulness for both hydrodesulfurization and hydrogenation.

EXAMPLE 2

This experiment was similar to that in Example 1, except that the catalyst precursor was ethylene diammonium thiomolbydate $(H_3N(CH_3)_2NH_3)MoS_4$. The in-situ catalyst formed had the composition:

$$MoS_{1.8}C_{2.3}$$

Figure 1:
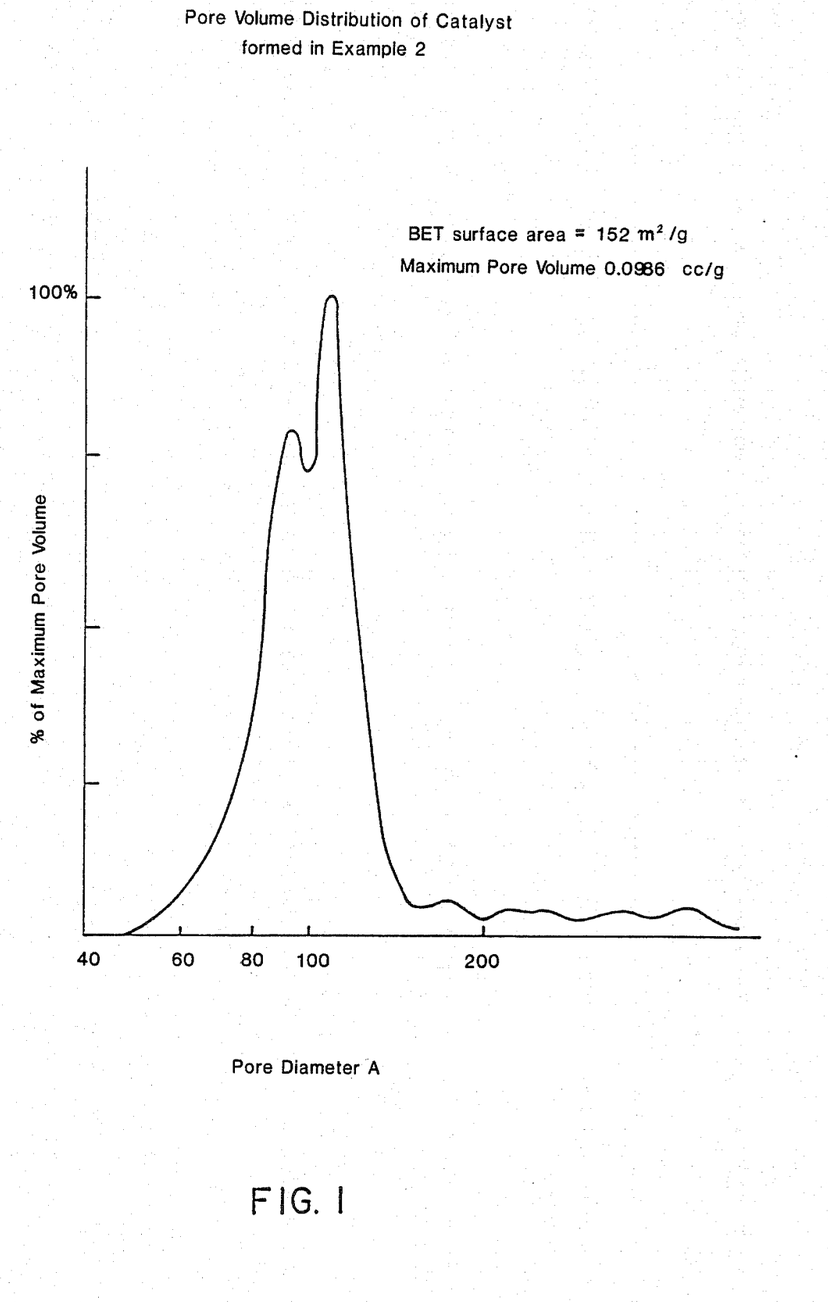
FIGS. 1 and 2 graphically illustrate the unusual pore volume distribution of two catalysts of this invention.

The relative HDS activity, r, of the catalyst was 82 with the selectivity factor, f, being 25. These results are also listed in Table 1. FIG. 1 illustrates the unusual pore volume distribution of this catalyst.

EXAMPLE 3

This experiment was similar to that of Example 2, except that the catalyst precursor was ethylene diammonium molybdate $(H_3N(CH_2)_2NH_3)MoO_4$. This produced a catalyst having the following composition:

$$MoS_{1.9}C_{0.96}$$

The relative HDS activity of this catalyst was found to be 95 with a selectivity factor of 43. These results are also contained in Table 1.

EXAMPLE 4

This experiment was similar to that of Example 1 except that the catalyst precursor was tetrabutylammoniumthiomolybdate [(CH$_3$(CH$_2$)$_3$)$_4$N]$_2$MoS$_4$ which formed a catalyst in-situ having the following composition:

MoS$_{1.79}$C$_{2.8}$

The surface area of this catalyst was measured using the BET method and was found to be about 152 M$^2$/g. The HDS activity and selectivity factors were found to be 305 and 49, respectively, which data is also presented in Table 1. Data for the pore volume, average pore size and pore distribution for this catalyst are presented in Table 3.

EXAMPLE 5

This experiment was identical to that of Example 1 except that the catalyst precursor was tridodecylammonium oxythiomolybdate (CH$_3$(CH$_2$)$_{11}$)$_3$NHMoO$_2$S$_2$ which produced a catalyst in-situ having a composition:

MoS$_{1.98}$C$_{2.7}$

Figure 2:
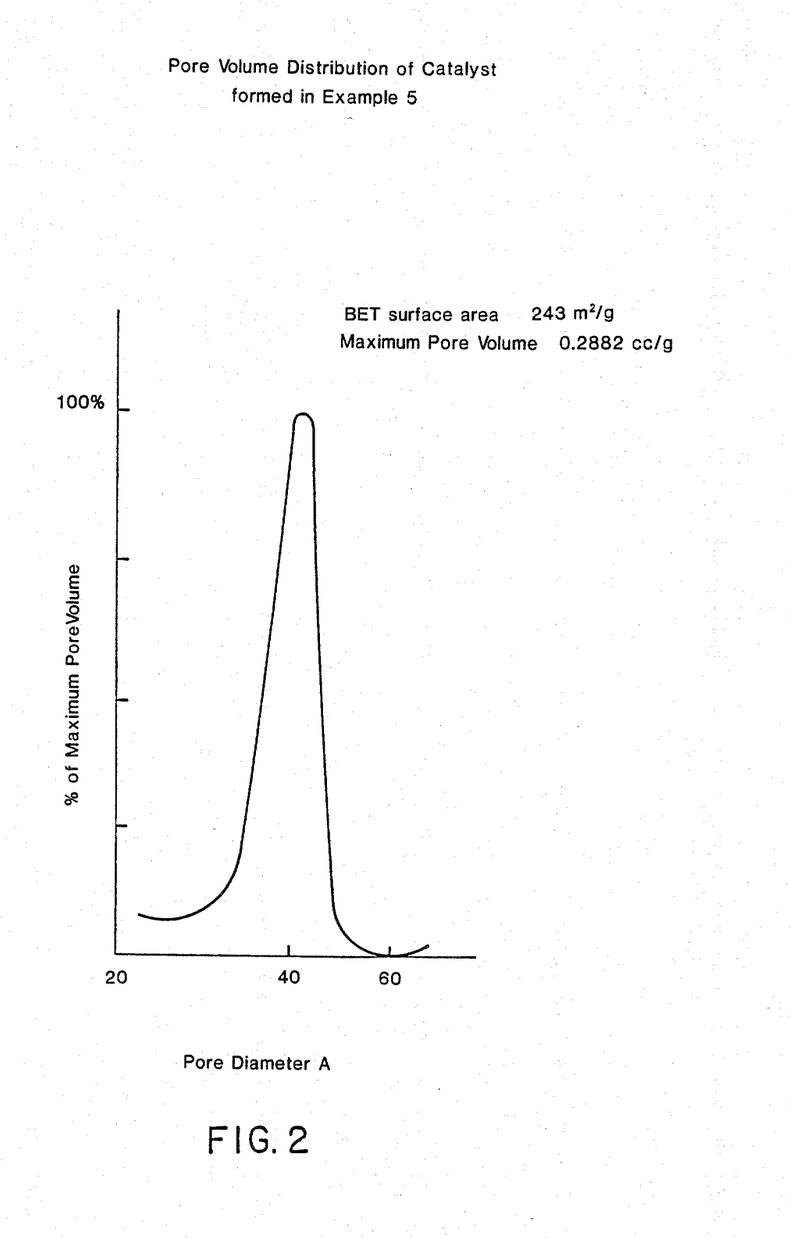

BET analysis of the catalyst revealed it to have a surface area of 243 M$^2$/g. The relative HDS activity of 145 and the selectivity factor was 15. This data is also presented in Table 1. FIG. 2 illustrates the unusually narrow pore volume distribution of this catalyst.

EXAMPLE 6

This experiment was identical to that of Examples 1-5 except that the catalyst precursor was tridodecylammonium molybdate (CH$_3$(CH$_2$)$_{11}$)$_3$NHMoO$_4$, which produced a catalyst in-situ having the composition MoS$_{1.2-1.7}$C$_{1.4-1.8}$. The relative HDS activity was 132 and the selectivity factor was 34. BET analysis of this in-situ produced catalyst showed that it had an area of 230 M$^2$/g. Data relating to pore volume and pore size distribution are given in Table 3.

EXAMPLES 7-9

These experiments were identical to those of Examples 1-5, with the exception that the catalyst precursor was first dried in helium at a temperature of from between 100°–150° C. for a period ranging from about 24–72 hours. The catalyst precursors were ammonium thiomolybdate, (NH$_4$)$_2$MoS$_4$, n-dodecylaminethiomolybdate CH$_3$(CH$_2$)$_{11}$NHMoS$_4$, and tridodecylammonium oxythiomolybdate (CH$_3$(CH$_2$)$_{11}$)$_3$NH$_2$MoSO$_3$ which produced in-situ catalysts having the following respective compositions;

MoS$_{1.85}$C$_{0.29}$, MoS$_{1.79}$C$_{0.76}$ and

MoS$_{1.5-2.0}$C$_{1.7-2.2}$.

The BET surface area of the catalyst formed from the tridodecylammonium oxythiomolybdate was 364 M$^2$/g. Data on the pore volume and pore size distribution of this catalyst are presented in Table 3. The relative HDS activities and selectivity factors are given in Table 2.

Comparison of the data in Table 2 with that in Table 1 shows that although the carbon content of the catalysts formed from the helium pre-dried precursors was slightly different than if they had not been dried, both the relative HDS activities and the selectivities were substantially the same for both cases.

EXAMPLE 10

In this experiment, 2 grams of ammonium thiomolybdate were refluxed in tetralin under nitrogen for between four and eight hours and a black catalyst powder was recovered which was washed in tetralin and analyzed according to the procedure set forth in Example 1. The composition of this ex-situ formed catalyst was found to be MoS$_{2.99}$C$_{1.34}$. The catalyst was pelletized to a 20/40 Tyler mesh, mixed with beads, etc. and placed in the Carberry-type reactor with the DBT/Decalin mixture, etc. following the procedure in Example 1. The relative HDS activity was 95 and the selectivity factor was 34.

EXAMPLE 11

This experiment was identical to that of Example 10, except that the catalyst precursor was tridodecyl ammonium molybdate (see Example 6) which was refluxed in tetralin under a blanket of H$_2$S. The composition of the catalyst initially formed ex-situ was found to be MoS$_{0.7}$C$_{9.4}$ which had a relative HDS activity of 259 and a selectivity factor of 27. Subsequent analysis of the catalyst after being "on-stream" in the reactor for 8 hours revealed a substantial change in its sulfur and carbon content, which is probably due to the catalyst changing to a more stable equilibrium phase in the reactor (compare to Example 6).

EXAMPLE 12

This example demonstrates the effectiveness of promoting the catalysts of this invention with a Group VIII metal, which in this particular case was cobalt. The catalyst used was that produced in Example 5 by the in-situ decomposition of tridodecyl ammonium oxythiomolybdate which had a relative HDS activity of 145 and selectivity of 15. This catalyst was promoted by soaking in an acetone solution of Co(NO$_3$)$_2$ followed by drying and then presulfiding with an 85/15 mixture of H$_2$/H$_2$S at 400° C. for two (2) hours. This resulted in the catalyst containing 8 wt.% of Co as cobalt sulfide, based on the total catalyst weight.

The 8% cobalt promoted catalyst was then placed back into the reactor and was found to have a relative HDS activity of 349 with a selectivity factor of 8 after eight hours on-stream. This 8% Co promoted catalyst was then recovered, washed with Decalin and dried by placing in a vacuum oven at 50° C. The dry catalyst was then impregnated a second time with the Co(NO$_3$)$_2$ acetone solution and sulfided as before (H$_2$/H$_2$S) to yield a catalyst containing 12 wt.% Co as cobalt sulfide. This catalyst was placed back in the reactor and was found to have a relative HDS activity of 255 with a selectivity of 6. By way of comparison, a standard cobalt molybdate on alumina HDS catalyst in commercial use had a relative HDS activity of 100. The results of this experiment of this experiment are summarized in Table 4.

TABLE 1

Catalysts Produced by In-Situ Decomposition of Ammonium Salts

| Anion* | Cation | | | |
|---|---|---|---|---|
| | $(NH_4)^+$ | $(H_3N(CH_2)_2NH_3)^{2+}$ | $(CH_3(CH_2)_3)_4N^+$ | $(CH_3(CH_2)_{11})_3NH^+$ |
| $MoS_4^{2-}$ | $MoS_{1.93}C_{0.94}$ | $MoS_{1.8}C_{2.3}$ | $MoS_{1.79}C_{2.8}$ | |
| r | 100 | 82 | 305 | |
| f | 50 | 25 | 49 | |
| $MoO_2S_2^{2-}$ | | | | $MoS_{1.98}C_{2.7}$ |
| r | | | | 145 |
| f | | | | 15 |
| $MoO_4^{2-}$ | | $MoS_{1.9}C_{0.96}$ | | $MoS_{1.2-1.7}C_{1.4-1.8}$ |
| r | | 95 | | 132 |
| f | | 43 | | 34 |

*NOTE:
r is normalized HDS zero order rate constant and f is the selectivity factor as defined in Example 1.

TABLE 2

Catalysts Produced by In-Situ Decomposition of Ammonium Salts Pre-dried in Helium

| Anion* | Cation | | |
|---|---|---|---|
| | $(NH_4)_2^{2+}$ | $CH_3(CH_2)_{11}NH_3^+$ | $(CH_3(CH_2)_{11})_3NH^+$ |
| $MoS_4^{2-}$ | $MoS_{1.85}C_{0.29}$ | $MoS_{1.79}C_{0.76}$ | |
| r | 95 | 182 | |
| f | 40 | 53 | |
| $MoSO_3^{2-}$ | | | $MoS_{1.5-2.0}C_{1.7-2.2}$ |

Note:
See note in Table 1.

TABLE 3

Unusual Catalyst Pore Volume Distributions

| Precursor | $[(CH_3(CH_2)_3)_4N]_2MoS_4^{(a)}$ | $(CH_3(CH_2)_{11})_3NH_2MoO_4^{(b)}$ | $(CH_3(CH_2)_{11})_3NH_2MoO_3S_1^{(c)}$ |
|---|---|---|---|
| Surface Area | 152 m²/gm | 230 m²/gm | 364 m²/gm |
| Pore Volume | 0.0986 cc/gm | 0.6889 cc/gm | 0.8982 cc/gm |
| Average Pore Size | 25.9Å | 119.92Å | 98.6Å |
| Pore Distribution | | | |
| 1200–600 | | 26.5 | 9.5 |
| 600–400 | | 9.9 | 6.9 |
| 400–400 | | 5.4 | 4.4 |
| 300–250 | | 3.1 | 3.1 |
| 250–200 | | 3.7 | 3.8 |
| 200–150 | | 4.6 | 4.5 |
| 150–100 | | 8.8 | 8.7 |
| 100–50 | | 17.6 | 31.8 |
| 50–20 | 100% | 20.4 | 27.1 |

Notes:
[a] See Example 4
[b] See Example 6
[c] See Example 9

TABLE 4

COBALT PROMOTED CATALYSTS

| Catalyst | Relative HDS Activity |
|---|---|
| Conventional Co/Mo on $Al_2O_3$ | 100 |
| $MoS_{1.98}C_{2.7}$ | 42 |
| $MoS_{1.98}C_{2.7}$ + 8% Co | 349 |
| $MoS_{1.98}C_{2.7}$ + 12% Co | 255 |

EXAMPLE 13

This Example demonstrates how the process of U.S. Pat. No. 4,243,553 does not produce the catalysts useful in the process of this invention. In this example, 1 gram of n-dodecylamine thiomolybdate $(CH_3(CH_2)_{11}NH_2)_2MoS_4$ was thermally decomposed by heating at 400° C. in flowing helium for 1 hour which yielded a black powder having a BET surface area of 243 m²/gm. The carbon content of the decomposed product was 17.1% yielding a value for z' of 3.3 which lies outside of the value for z' for catalysts of the instant invention.

The same procedure was used as in Example 1. That is, the decomposition product was pelletized, crushed to a 20–40 mesh size and put in an autoclave containing 100 ml of decalin which contained 5 wt.% dibenzothiophene (DBT). Hydrogen was introduced into the autoclave at a flow rate of 100 cc/min and a pressure of 450 psi and the temperature in the autoclave was maintained at 350° C. for eight hours which yielded a catalyst having a rate constant of only $10.5 \times 10^{16}$ molecules of DBT desulfurized per gram of catalyst per second.

Not only does this show that the process in U.S. Pat. No. 4,243,553 does not produce the catalysts of this invention, it also shows that high surface area of itself does not produce a good catalyst.

The above experiment was repeated but with the precursor decomposed in helium at 600° C. This also resulted in an unsatisfactory catalyst having a rate constant of only $9.2 \times 10^{16}$.

EXAMPLE 14

This example demonstrates the necessity of contacting the catalyst precursor with both a hydrocarbon and sulfur at the same time, at elevated temperature, in order to form a catalyst of this invention. In this experiment, a 1 gram sample of tridodecylamine molybdate was refluxed in tetralin for 18 hours at about 206° C. A black powder was produced which was then contacted with a mixture of 15% $H_2S$ in $H_2$ for 10 hours at 350° C. This produced a molybdenum disulfide product which had a value of 30 for z' which is outside the scope of the value for z' for catalysts of this invention. This product was then washed with Decalin, pelletized and placed in the Carberry reactor with the DBT/Decalin feed following the procedure in Example 1. After being on stream in the reactor for 11 hours, the black powder was found to have a rate constant of only $10.6 \times 10^{16}$.

EXAMPLE 15

This example also demonstrates the necessity of contacting the catalyst precursor, at elevated temperature, with hydrogen, a hydrocarbon and sulfur at the same time in order to form a catalyst of this invention. In this experiment, a 1 gram sample of tetrabutylammonium thiomolybdate (see Example 4) was placed in a quartz tube in a muffle furnace at 350° C. and a flowing mixture of 15% $H_2S$ in $H_2$ was contacted with the precursor for about 7 hours. The resulting powder, which had a surface area of only 0.8 $m^2/g$, was then washed with Decalin, pelletized, etc., and placed in the Carberry reactor with the DBT/Decalin feed and, after being on stream for about 11 hours, was found to have a hydrodesulfurization activity of only $1.7 \times 10^{16}$.

EXAMPLE 16

This example was similar to Example 14, except after the tridodecylamine molybdate was refluxed in tetralin and washed with Decalin, it was then placed in the DBT/Decalin feed in the Carberry reactor without the intermediate hydrogen sulfide treatment. The so-formed catalyst had an HDS rate constant of only $3.9 \times 10^{16}$ and was essentially molybdenum disulfide with a BET surface area of 300 $m^2/g$. The z' value of the catalyst was 30.

EXAMPLE 17

This example demonstrates the effectiveness of the catalysts of this invention for hydrodenitrogenation. In this example, a catalyst of this invention was formed in-situ from a tetrabutylammonium-thiomolybdate precursor using the procedure set forth in Example 4. After the catalyst had been formed in-situ in the reactor, it was removed from the reactor, washed with fresh Decalin and placed back in the reactor with a fresh feed of 5 wt.% DBT in Decalin to which had been added 1100 ppm of nitrogen as Quinoline. The temperature and pressure in the reactor were then brought up to 325° C. and 450 psi of hydrogen at a hydrogen flow rate at about 100 cc/min. The reactor was maintained at these conditions for six hours and a sample of the feed was removed from the reactor every hour and analyzed for nitrogen.

Figure 3:
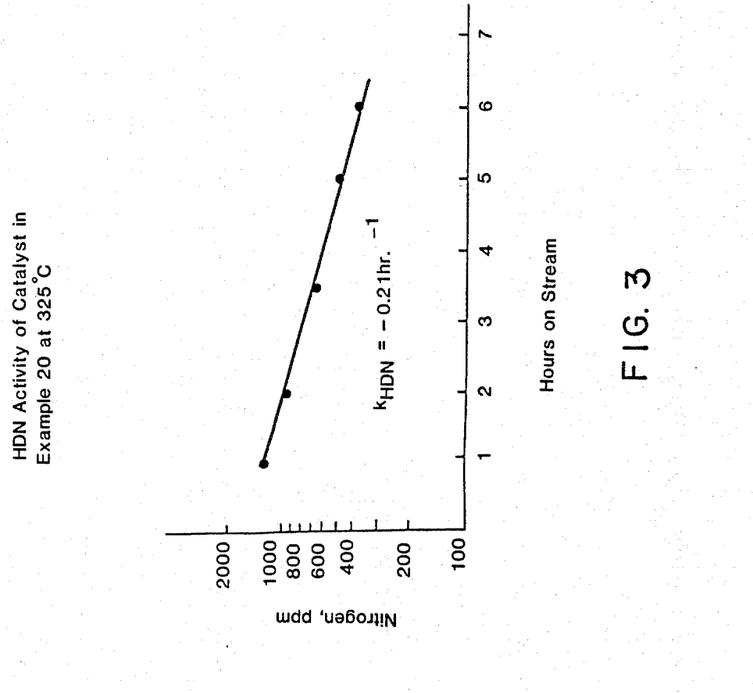
FIGS. 3 and 4 graphically illustrate the hydrodenitrogenation of a feed in contact with a catalyst of this invention formed from a tetrabutylammonium thiomolybdate precursor.

The results are shown in FIG. 3. The hydrodenitrogenation rate constant for the catalyst was calculated to be:

$$k_{HDN} = -0.21 \text{ hr}^{-1}.$$

Also, after the six hours onstream, the feed was measured for sulfur and the results indicated that 5 wt.% of the DBT in the feed had been desulfurized.

Figure 4:
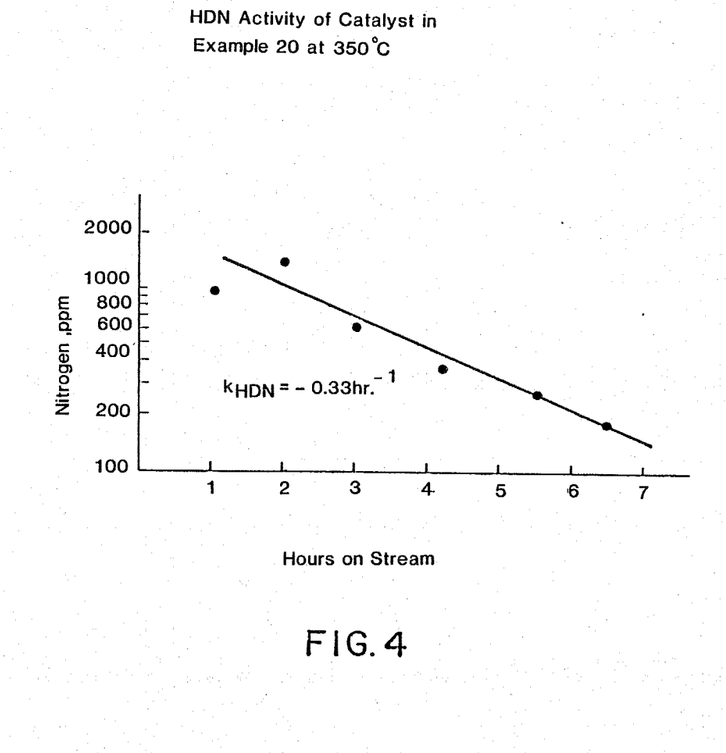

Repeating this experiment with a fresh sample of catalyst and feed at a temperature at 350° C. resulted in a hydrodenitrogenation rate constant $k_{HDN} = -0.33$ $hr^{-1}$ and 10 wt.% of the DBT originally present in the feed had been desulfurized after the six hours. The results of this 350° C. run are shown in FIG. 4.

EXAMPLE 18

Figure 5:
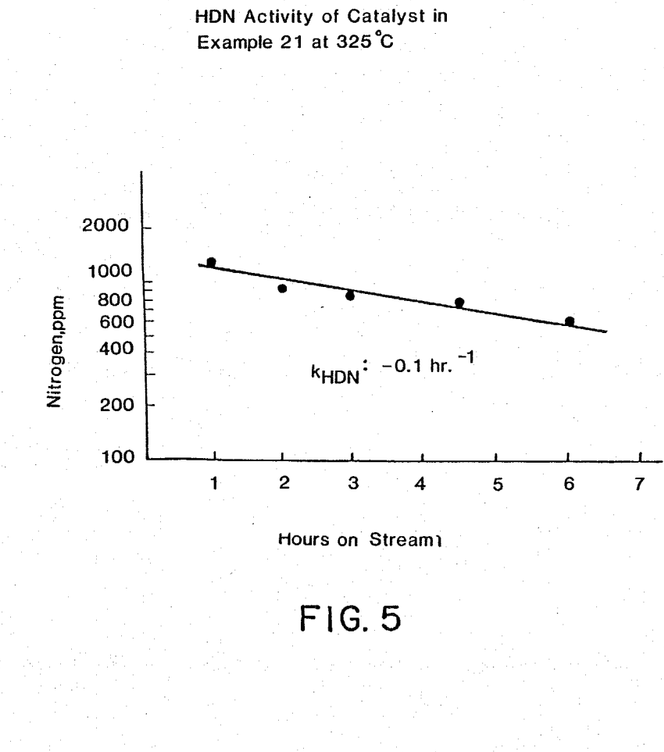
FIGS. 5 and 6 graphically illustrate the hydrodenitrogenation of a feed in contact with a catalyst of this invention formed from a tridodecylammonium molybdate precursor.
Figure 6:
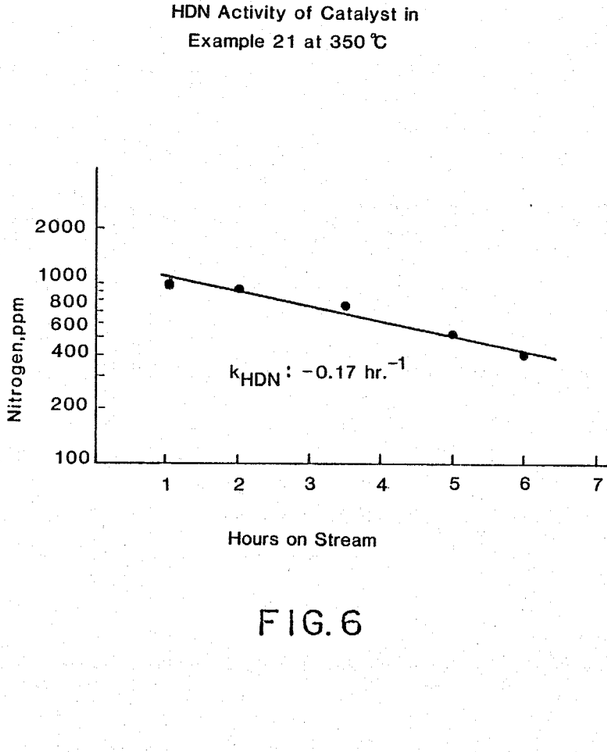

This experiment was similar to that of example 17, except that the catalyst was formed in-situ in the reactor from a tridodecylammonium molybdate precursor. Two runs were made, one at 325° C. and one at 350° C. as was done in example 20. The results of these two runs are shown in FIGS. 5 and 6. At 325° C., the hydrodenitrogenation rate constant $k_{HDN} = -0.1$ $hr^{-1}$ and 5 wt.% of the DBT in the feed had been desulfurized after the sixth hour. At 350° C., the hydrodenitrogenation rate constant $k_{HDN}$ was found to be $-0.17$ $hr^{-1}$ and 10 wt.% of the DBT initially present in the feed had been desulfurized after the sixth hour.

EXAMPLE 19

In this example, both the hydrodenitrogenation and hydrodesulfurization rate constants of a conventional nickel molybdate on alumina hydrotreating catalyst were determined. A typical hydrotreating catalyst was prepared by impregnation and calcination techniques well-known to those of the art to produce a catalyst containing 4.5 wt.% CoO, 15.9 wt.% $MoO_3$, and 0.8 wt.% $P_2O_5$ with the balance being a reforming grade of —$Al_2O_3$. This catalyst was placed in the same reactor with the same feed and found to have a hydrodenitrogenation rate constant $k_{HDN}$ of $-0.07$ $hr^{-1}$ with a relative HDS activity of 28.7.

EXAMPLE 20

This experiment was similar to that of Example 4 except that the catalyst precursor was tetrabutylammonium thiotungstate $[(CH_3(CH_2)_3)_4N]_2WS_4$. The HDS activity rate constant and the selectivity factor were found to be $19.6 \times 10^{16}$ and 50, respectively.

EXAMPLE 21

This experiment illustrates the effect of the chain length of the alkyl radical in the catalyst precursor salt on the properties of the catalyst formed from the precursor. In this experiment, which was similar to that of Example 1, the activities of catalysts formed from various tetralkylamine thiomolybdate precursor salts were compared. The HDS activities and selectivities are presented in Table 5 and show that, in general, longer radicals resulted in better catalysts. Powder X-ray diffraction data of the catalysts showed that increasing the alkyl chain length of the precursor salt resulted in decreasing the crystallinity of the catalyst. However, all of the catalysts were poorly crystalline according to the X-ray data.

TABLE 5

| Tetralkylamine Radical of Precursor Salt* | r | f |
|---|---|---|
| Tetramethyl | 30.7 | 52.5 |
| Tetraethyl | 12.7 | 53.0 |
| Tetrabutyl | 42.0 | 55.5 |
| Tetrapentyl | 72.5 | 34.3 |

*All thiomolybdates.

What is claimed is:

1. A process for upgrading hydrocarbon feeds comprising contacting said feed, at hydrotreating conditions and in the presence of hydrogen, with a catalyst comprising a poorly crystalline, carbon-containing metal sulfide having the formula $MS_{2-z}C_{z'}$ wherein $0.01 \leq z \leq 0.5$ and $0.01 \leq z' \leq 3.0$ and wherein M is a metal selected from the group consisting of Mo, W and mixtures thereof.

2. The process of claim 1 wherein said catalyst contains nitrogen.

3. The process of claim 2 wherein said nitrogen is present in said catalyst in an amount of less than about one weight percent.

4. The process of claim 3 wherein said hydrotreating conditions include a pressure ranging from about atmospheric to 5000 psig.

5. The process of claim 4 wherein said hydrotreating conditions include a temperature ranging from about 100° to 500° C.

6. The process of claim 5 wherein said catalyst is promoted with one or more promoter metals.

7. The process of claim 6 wherein said promoter metal comprises iron, cobalt, nickel and mixtures thereof.

8. The process of either of claims 5 or 7 wherein said hydrotreating conditions include a temperature of from about 200° to 450° C.

9. The process of claim 8 wherein said hydrogen pressure ranges from about 100-2500 psig.

10. A process for hydrotreating a hydrocarbon feed which comprises contacting said feed, at hydrotreating conditions and in the presence of hydrogen, with a poorly crystalline catalyst of the compositon $MS_{2-z}C_{z'}$ wherein $0.01 \leq z \leq 0.5$ and $0.01 \leq z' \leq 3.0$ and wherein M is a metal selected from the group consisting of Mo, W and mixtures thereof.

11. The process of claim 10 wherein said catalyst contains less than about one weight percent nitrogen.

12. The process of either of claims 10 or 11 wherein said hydrotreating conditions include a pressure ranging from about 1 to about 5000 psig.

13. The process of claim 12 wherein said catalyst is promoted with one or more catalytic promoter metals.

14. The process of claim 13 wherein said promoter metal comprises iron, cobalt, nickel or mixtures thereof.

15. The process of claim 10 or 14 wherein said hydrotreating conditions include a temperature ranging from about 100°-500° C.

16. The process of claim 15 wherein said hydrotreating conditions include a pressure of about 100 to 2500 psig.

17. The process of claim 16 wherein said hydrotreating conditions include a temperature of from about 200°-400° C.

18. A process for hydrotreating a hydrocarbon feed which process comprises contacting said feed, at hydrotreating conditions and in the presence of hydrogen, with a catalyst comprising a poorly crystalline, nitrogen and carbon-containing sulfide of tungsten, molybdenum and mixtures thereof, wherein said catalyst has been formed by simultaneously contacting one or more catalyst precursors selected from the group consisting of (a) ammonium thiomolybdate or thiotungstate salts, (b) ammonium molybdate or tungstate salts, (c) substituted ammonium thiomolybdate or thiotungstate salt, and (d) substituted ammonium molybdate or tungstate salts and mixtures thereof, with sulfur, hydrogen and a hydrocarbon at a temperature of at least about 150° C. for a time sufficient to form said catalyst.

19. The process of claim 18 wherein said hydrocarbon used to form said catalyst comprises an aromatic hydrocarbon.

20. The process of claim 19 wherein said nitrogen is present in said catalyst in an amount of less than one weight percent.

21. The process of claim 20 wherein said catalyst is promoted with one or more promoter metals.

22. The process of claim 21 wherein said promoter metal comprises iron, cobalt, nickel and mixtures thereof.

23. A process for hydrotreating a hydrocarbon feed which comprises contacting said feed, at hydrotreating conditions and in the presence of hydrogen, with a catalyst comprising a poorly crystalline, carbon-containing sulfide of tungsten, molybdenum and mixture thereof, wherein said catalyst has been formed by simultaneously contacting one or more catalyst precursor salts, in the presence of sulfur and hydrogen and at an elevated temperature of at least about 150° C. with a hydrocarbon for a time sufficient to form said catalyst and wherein said precursor salt has the formula $B_x[MO_yS_{4-y}]$ wherein x is 1 or 2 and y is any value between 0 and 4, wherein M is Mo or W and wherein B is (a) an ammonium ion, or (b) an alkyl or aryl ion wherein said ion may contain from one to four alkyl or aryl groups.

24. The process of claim 23 wherein said catalyst contains nitrogen.

25. The process of claim 24 wherein said catalyst contains less than about 1% nitrogen.

26. The process of claim 25 wherein said hydrocarbon used to form said catalyst comprises an aromatic hydrocarbon.

27. The process of claim 26 wherein said catalyst is formed at a temperature of from about 200° C. to 600° C.

28. The process of either of claims 23, 25 or 27 wherein said hydrotreating conditions include a pressure of from about atmospheric to 5000 psig.

29. The process of claim 28 wherein said catalyst is promoted with one or more promoter metals.

* * * * *